US012811328B2

(12) United States Patent
Wu

(10) Patent No.: US 12,811,328 B2
(45) Date of Patent: Nov. 24, 2026

(54) FEMALE END MODULE AND LEAF SPRING TERMINAL STRUCTURE THEREOFF

(71) Applicants: DINKLE ENTERPRISE CO., LTD., New Taipei City (TW); DINKLE ELECTRIC MACHINERY (CHINA) CO., LTD., Kunshan City (CN); LI YANG ELECTRIC MACHINERY (DONGGUAN) CO., LTD., Dong Guan City (CN)

(72) Inventor: Shang-Tsai Wu, New Taipei City (TW)

(73) Assignees: DINKLE ENTERPRISE CO., LTD., New Taipei City (TW); DINKLE ELECTRIC MACHINERY (CHINA) CO., LTD., Kunshan City (CN); LI YANG ELECTRIC MACHINERY (DONGGUAN) CO., LTD., Dong Guan City (CN)

( * ) Notice: Subject to any disclaimer, the term of this patent is extended or adjusted under 35 U.S.C. 154(b) by 307 days.

(21) Appl. No.: 18/897,468

(22) Filed: Sep. 26, 2024

(65) Prior Publication Data

US 2026/0088545 A1 Mar. 26, 2026

(51) Int. Cl.
*H01R 13/11* (2006.01)
*H01R 13/187* (2006.01)

(52) U.S. Cl.
CPC ............ *H01R 13/11* (2013.01); *H01R 13/187* (2013.01)

(58) Field of Classification Search
CPC .... H01R 13/11; H01R 13/187; H01R 13/112; H01R 13/113; H01R 13/18
See application file for complete search history.

(56) References Cited

U.S. PATENT DOCUMENTS

| | | | | | |
|---|---|---|---|---|---|
| D1,096,655 | S * | 10/2025 | Wu | ............................. | D13/146 |
| D1,103,122 | S * | 11/2025 | Wu | ............................. | D13/147 |
| 2006/0014442 | A1 | 1/2006 | Allgood et al. | | |
| 2012/0289101 | A1 | 11/2012 | Lee et al. | | |
| 2013/0012072 | A1 * | 1/2013 | Costello | ................. | H01R 13/18 439/786 |
| 2021/0005997 | A1 * | 1/2021 | Wu | ........................ | H01R 13/41 |
| 2022/0384981 | A1 | 12/2022 | Shen et al. | | |

FOREIGN PATENT DOCUMENTS

| | | | | | |
|---|---|---|---|---|---|
| CN | 122000720 | A * | 5/2026 | | |
| KR | 102264936 | B1 | 6/2021 | | |
| WO | 2023/098849 | A1 | 6/2023 | | |
| WO | WO-2026088578 | A1 * | 4/2026 | ........... | H01R 13/187 |

* cited by examiner

*Primary Examiner* — Travis S Chambers
(74) *Attorney, Agent, or Firm* — HDLS IPR SERVICES; Chun-Ming Shih

(57) ABSTRACT

The present disclosure relates to a female end module and a leaf spring terminal structure thereof. The female end module (10) includes a conductive sheet (1) having two arms (11), the two arms (11) having two inner walls (12) arranged opposite from each other, and two leaf spring terminal structures (2) installed on each of the arms (11) respectively. Each of the leaf spring terminal structures (2) includes a movable bracket (21) movably connected to the arm (11) to move close to or away from the inner wall (12), a plurality of terminals (22) disposed on the movable bracket (21) and extended in a direction away from the inner wall (12), and an elastic arm (23) disposed on the movable bracket (21) and extended in a direction towards the inner wall (12) and abutting against the inner wall (12).

12 Claims, 8 Drawing Sheets

FEMALE END MODULE AND LEAF SPRING TERMINAL STRUCTURE THEREOFF

BACKGROUND OF THE DISCLOSURE

Technical Field

The present disclosure relates to a female terminal structure installed inside a terminal block or a connector, and in particular, to a female end module and a leaf spring terminal structure thereof.

Description of Related Art

High-current connectors are commonly installed at the internal of terminal blocks, and they are used to connect the bus bars of network energy equipment, unit basestation, server, internet network equipment or industrial power distribution equipment to circuit boards.

A traditional high-current connector mainly includes a female end component and a male end terminal connected to the female end component. The female end component includes a conductive sheets and a multi-contact terminal. The conductive sheet is secured inside the terminal block and includes two arms arranged opposite from each other and extended therefrom. The multi-contact terminal is installed on the arm, and when the male end terminal is inserted into the terminal block, it is clamped by the multi-contact point terminal in order to establish the electrical connection.

However, male end terminals of different brands or models available in the market have different thickness. If the thickness of the male end terminal is too thin, gap may be formed in the multi-contact terminal such that it may not attach to the multi-contact terminal properly. On the other hand, if the thickness of the male end terminal is too thick, it may be blocked by the multi-contact terminal such that it cannot be inserted into the terminal block easily, resulting in the improper use of the high-current connector.

In view of the above, the inventor seeks to overcome the aforementioned drawbacks associated with the current technology and aims to provide an effective solution through extensive researches along with utilization of academic principles and knowledge.

SUMMARY OF THE INVENTION

The present disclosure provides a female end module and a leaf spring terminal structure thereof, and the leaf spring terminal structure is able to adjust a gap between a movable bracket and an inner wall via the compression of elastic arms to achieve the advantage of broad applicability of the female end module and the leaf spring terminal structure thereof of the present disclosure to various male end terminals of different brands and models.

In an exemplary embodiment of the present disclosure, the present disclosure provides a female end module having: a conductive sheet having two arms, the two arms having two inner walls arranged opposite from each other; and two leaf spring terminal structures installed on each of the arms respectively, each of the leaf spring terminal structures having: a movable bracket movably connected to the arm to move close to or away from the inner wall; a plurality of terminals disposed on the movable bracket and extended in a direction away from the inner wall; and at least one elastic arm disposed on the movable bracket and extended in a direction towards the inner wall and abutted against the inner wall.

In an exemplary embodiment of the present disclosure, the present disclosure provides a leaf spring terminal structure, installed on a conductive sheet, the conductive sheet having an inner wall, the leaf spring terminal structure having: a movable bracket movably connected to the conductive sheet in order to move close to or away from the inner wall; a plurality of terminals disposed on the movable bracket and extended in a direction away from the inner wall; and at least one elastic arm disposed on the movable bracket and extended in a direction towards the inner wall and abutted against the inner wall.

In view of the above, the leaf spring terminal structure is able to adjust a gap between a movable bracket and an inner wall via the compression of elastic arms to allow the elastic arm and the movable bracket to share the pressure exerted on the terminal. Accordingly, when the female end module of the present disclosure is used in conjunction with a male end terminal of different thicknesses, the situation of deformation of the terminal due to excessive compression or excessive clamping of the male end terminal may be prevented, thereby achieving the advantage of broad applicability of the female end module and the leaf spring terminal structure thereof of the present disclosure to various male end terminals of different brands and models.

DETAILED DESCRIPTION

Figure 1:
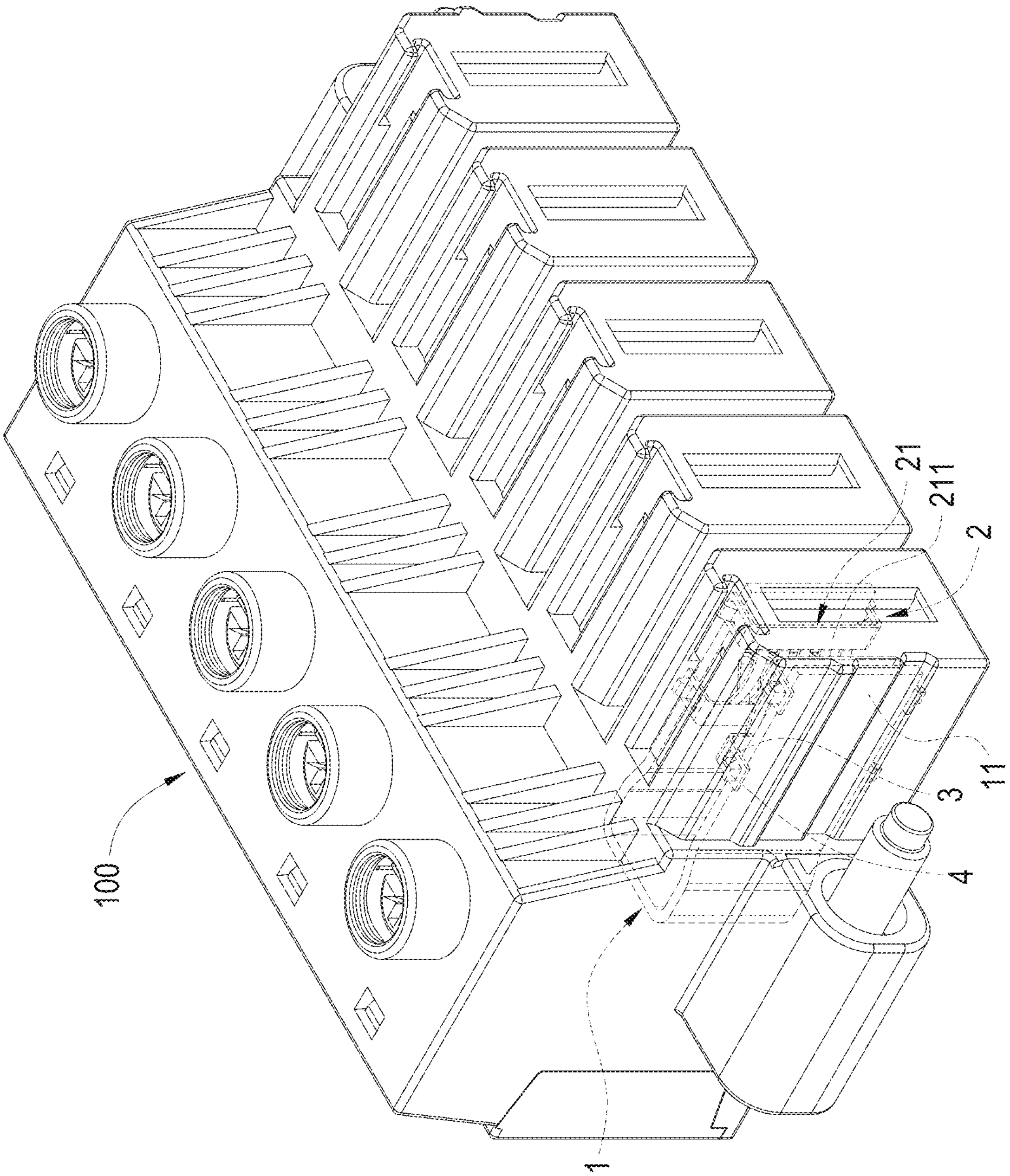
FIG. 1 is a perspective view of the female end module of the present disclosure installed on a terminal block.
Figure 2:
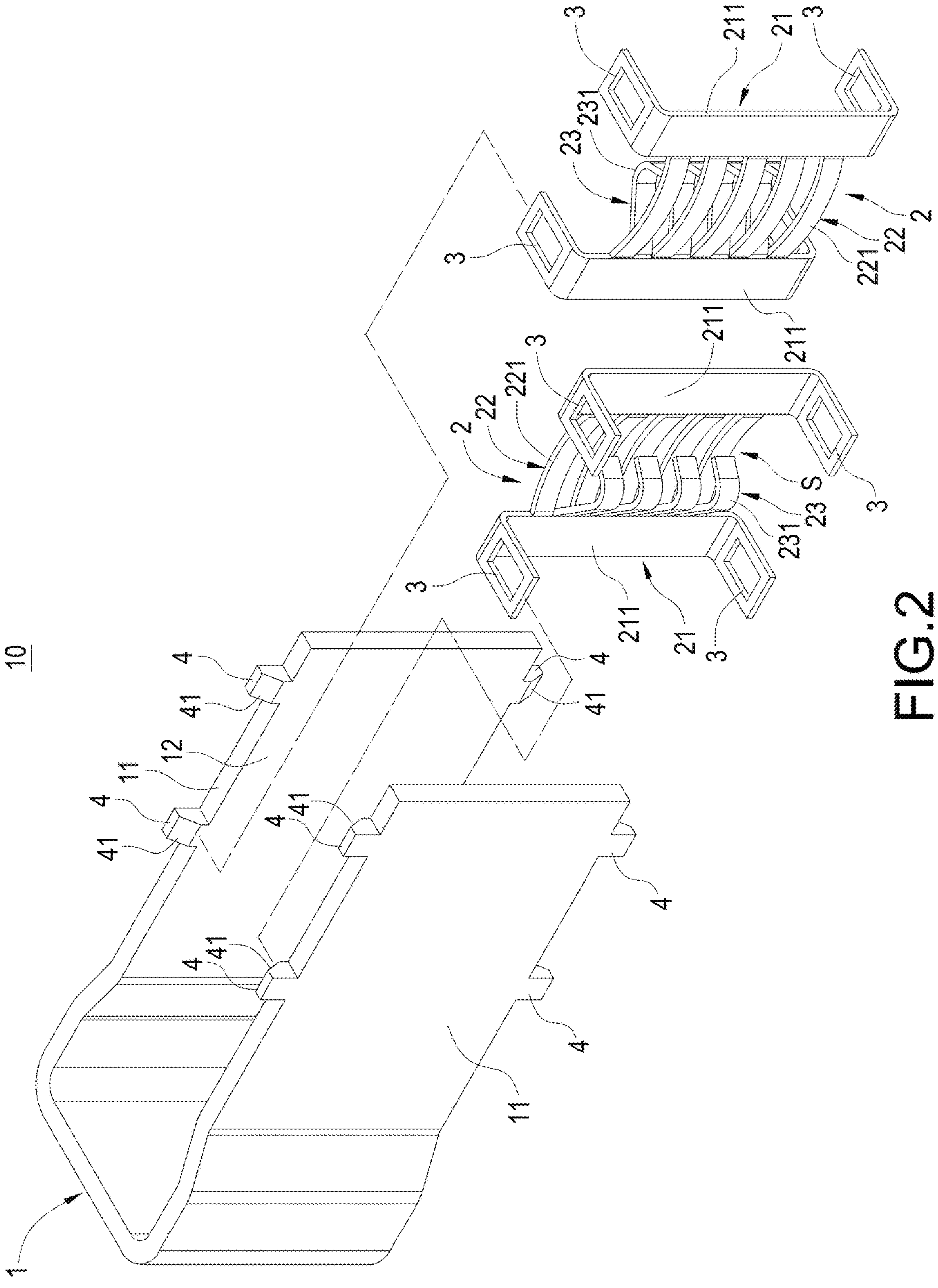
FIG. 2 is a perspective exploded view of the female end module of present disclosure.
Figure 3:
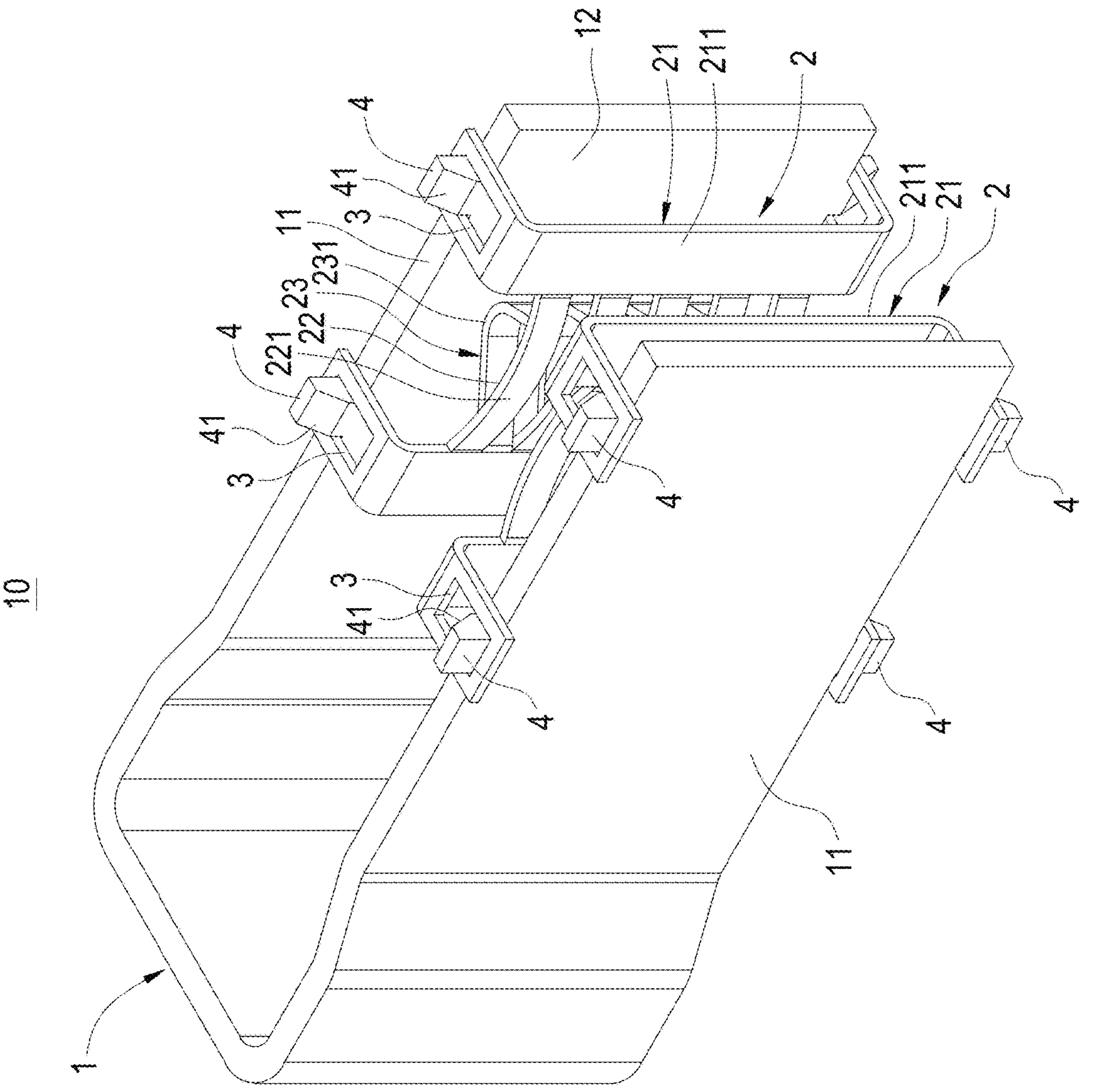
FIG. 3 is a perspective assembly view of the female end module of the present disclosure.

The technical contents of this disclosure will become apparent with the detailed description of embodiments and the accompanied drawings as follows. However, it shall be noted that the accompanied drawings for illustrative purposes only such that they shall not be used to restrict the scope of the present disclosure.

Please refer to FIG. 1 to FIG. 8. The present disclosure provides a female end module and a leaf spring terminal structure thereof, used in a terminal block 100 and a male end terminal 200. The female end module 10 mainly includes a conductive sheet 1 and two leaf spring terminal structures 2. The leaf spring terminal structure 2 mainly includes a movable bracket 21, a plurality of terminals 22 and one or a plurality of elastic arms 23.

As shown in FIG. 1 to FIG. 8, the conductive sheet 1 is installed at the internal of the terminal block 100. The conductive sheet 1 is in a U shape; however, it is not limited to such shape only. The conductive sheet 1 includes two arms 11, and the inner sides of the two arms 11 include two inner walls 12.

As shown in FIG. 1 to FIG. 8, each of the leaf spring terminal structure 2 is installed on each of the arms 11 respectively. When a male end terminal 200 is inserted into the terminal block 100, the male end terminal 200 is inserted between the two leaf spring terminal structures 2 and is electrically connected to the conductive sheet 1 via the two leaf spring terminal structures 2. Each of the leaf spring terminal structure 2 includes a movable bracket 21, a plurality of terminals 22 and one or a plurality of elastic arms 23.

Detailed description is further provided in the following. One of each of the arms 11 and each of the movable brackets 21 includes one or a plurality of slots 3, another one of each of the arms 11 and each of the movable brackets 21 includes one or a plurality of sliders 4 slidably engaged with the one or a plurality of slots 3 respectively, thereby allowing each of the movable brackets 21 to be movably connected to each of the arms 11 to move close to or away from the inner wall 12. In other words, each of the movable brackets 21 is able to move close to or away from each of the inner walls 12.

In addition, in this exemplary embodiment, the quantity of the slots 3 and the quantity of the sliders 4 are eight respectively; however, they are not limited to such quantity only. Each of the four sliders 4 protrudes outward from a top and bottom of each of the arms 11 respectively, and each of the movable brackets 21 includes two U-shaped racks 211 arranged corresponding to each of the inner walls 12. Each of the two slots 3 are formed at two ends of each of the U-shaped racks 211 respectively, such that the U-shape racks 211 are mounted at an external of the sliders 4 of the arms 11 via the slots 3 and are able to slide relative to the slider 4, thereby allowing the movable bracket 21 to move close to or away from each of the inner walls 12.

Furthermore, the inner surface of each of the slider 4 includes a slanted surface 41 having a thickness gradually increased in a direction towards the arm 11. The slanted surface 41 is used to guide the U-shaped rack 211 to be installed from the inner surface of the slider 4, such that the two ends of the U-shaped rack 211 is able to abut against and slide along the slanted surface 41 to reach the slider 4 arranged inside the slot 3.

Moreover, the plurality of terminals 22 extend from each of the movable brackets 21 in a direction away from the inner wall 12. In this exemplary embodiment, two ends of each of the terminals 22 are integrally formed to extend and connect between each of the two U-shaped racks 211 and are used to abut against an arched rib 221 of the male end terminal 200. However, the present disclosure is not limited to such configuration only. The two ends of each of the terminals 22 may also be integrally formed to extend and connect between each of the two U-shaped racks 211 and are used to abut against a V-shaped or W-shaped rib, or a rib of any other geometrical shapes, of the male end terminal.

In addition, the elastic arm 23 extends from each of the movable brackets 21 in a direction towards the inner wall 12 and abuts against the inner wall 12. In this exemplary embodiment, the quantity of the elastic arms 23 is multiple. Each of the elastic arms 23 is a V-shaped rib 231 having one end extended from one of the U-shaped racks 211 and another end forming a gap S with another one of the U-shaped racks 211. However, the present disclosure is not limited to such configuration only. Each of the elastic arms 23 may also be a U-shaped or W-shaped rib 231, or a rib of any other geometrical shape, having one end extended from one of the U-shaped racks 211 and another end forming a gap S with another one of the U-shaped racks 211.

Furthermore, in this exemplary embodiment, the plurality of arched ribs 221 and the plurality of V-shaped ribs 231 of each of the leaf spring terminal structures 2 are arranged alternatively to each other. In other words, the plurality of terminals 22 and the plurality of elastic mars 23 are arranged alternatively to each other. Since the leaf spring terminal structure 2 is formed via stamping, cutting and bending of a conductive sheet, the alternative arrangement of the plurality of terminals 22 and the plurality of elastic arms 23 is able to prevent excessive stamping and cutting of slots on a conductive sheet, such that waste of copper plates and scraps generated from the manufacturing process may be reduced significantly.

Figure 4:
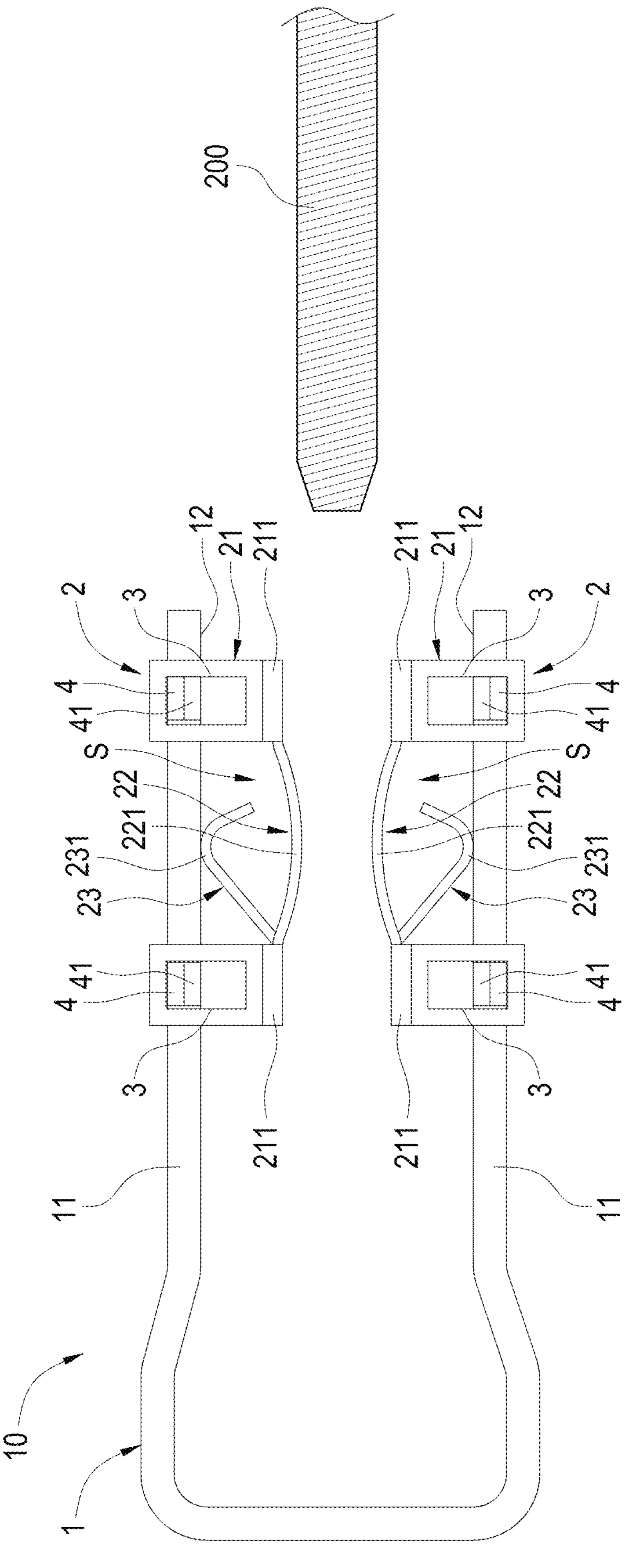
FIG. 4 is a top view of a state of use of the female end module of the present disclosure having a male end terminal of a relatively small thickness inserted therein.
Figure 5:
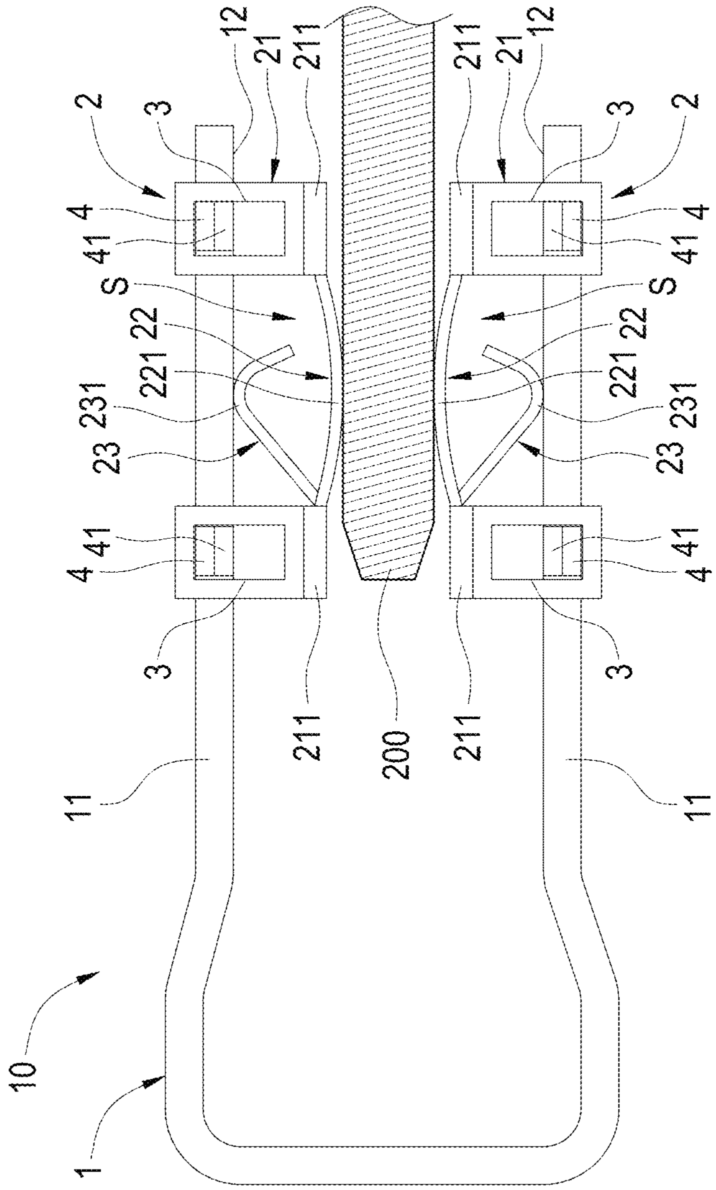
FIG. 5 is a top view of another state of use of the female end module of the present disclosure having a male end terminal of a relatively small thickness inserted therein.
Figure 6:
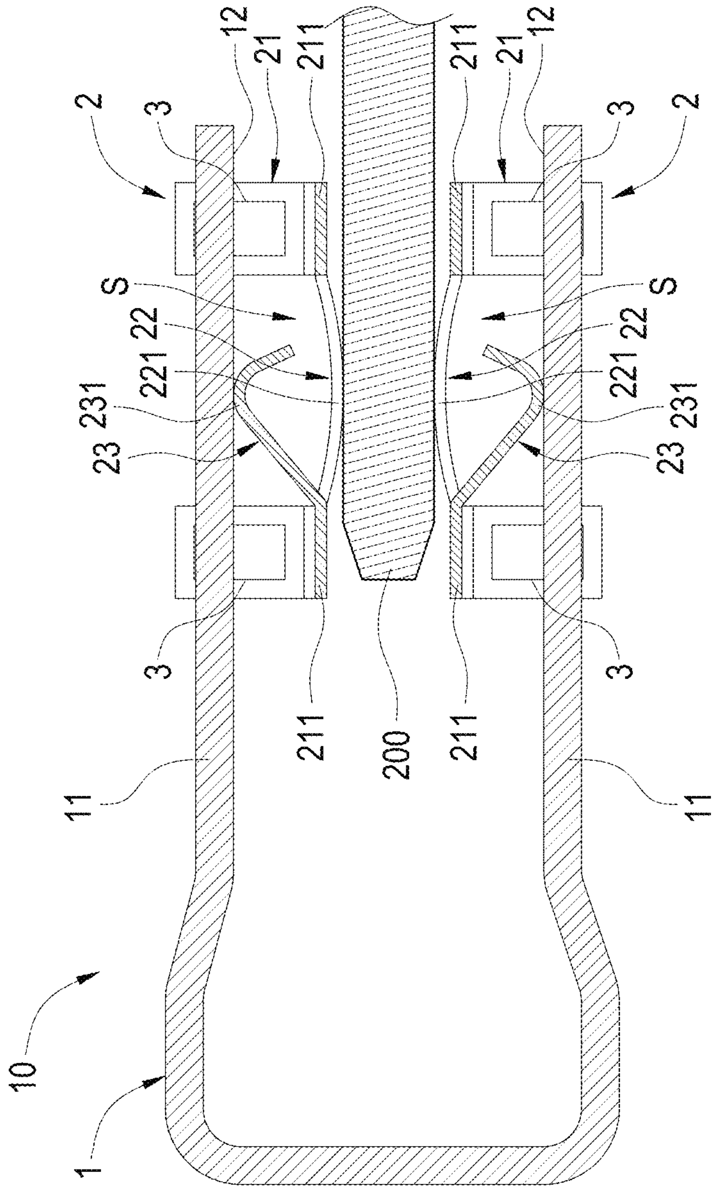
FIG. 6 is a cross sectional view of a state of use of the female end module of the present disclosure having a male end terminal of a relatively small thickness inserted therein.
Figure 7:
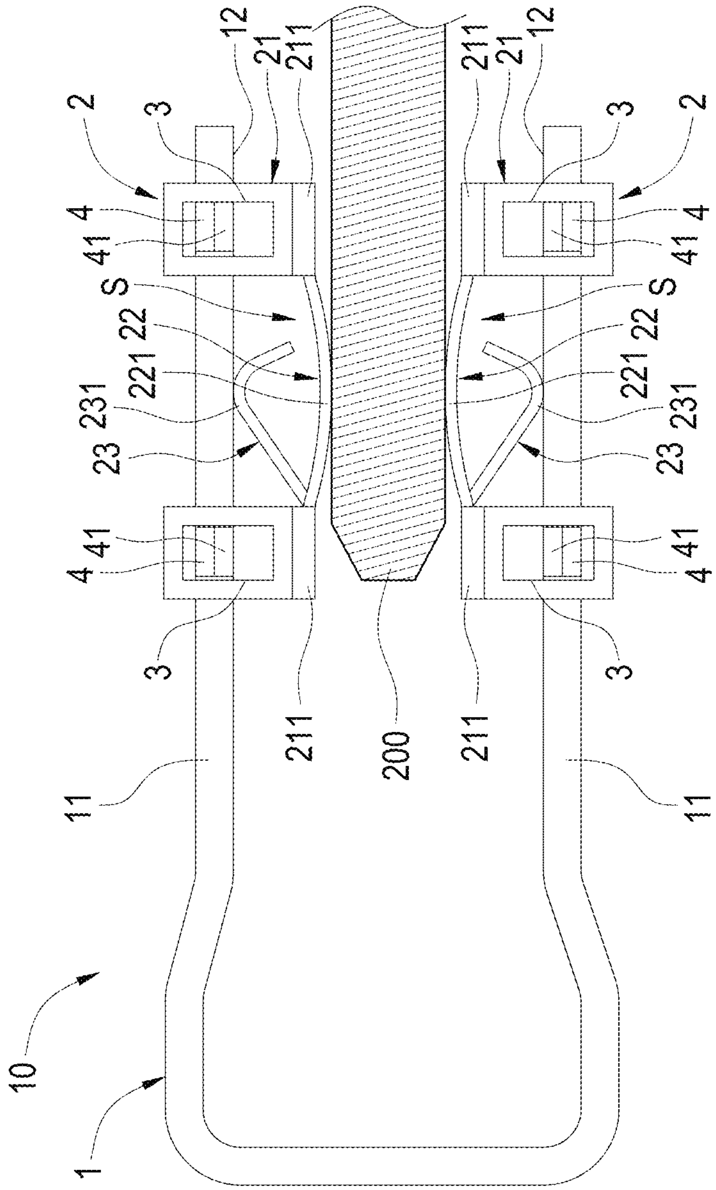
FIG. 7 is a top view of a state of use of the female end module of the present disclosure having a male end terminal of a relatively large thickness inserted therein.
Figure 8:
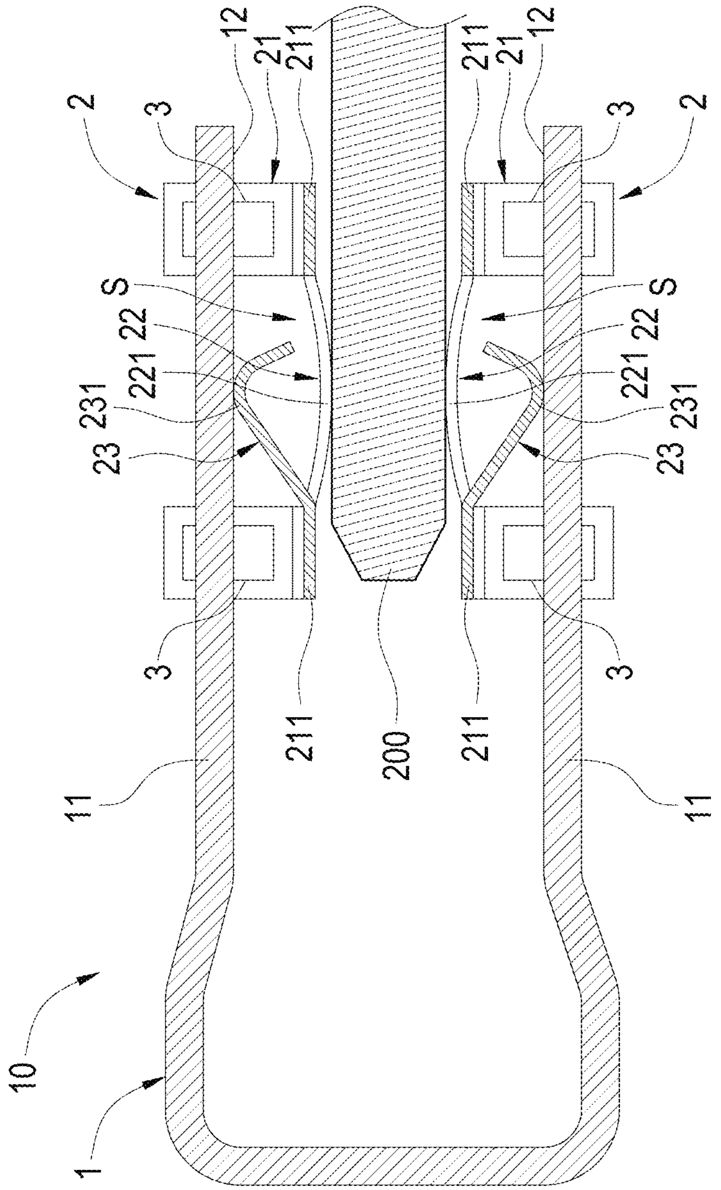
FIG. 8 is a cross sectional view of a state of use of the female end module of the present disclosure having a male end terminal of a relatively large thickness inserted therein.

Please refer to FIG. 4 to FIG. 6, illustrating the state of use of the female end module 10 of the present disclosure having a male end terminal 200 of a relatively small thickness inserted therein. Since each of the movable brackets 21 is able to move close to or away from each of the inner walls 12, when the male end terminal 200 is inserted between the two leaf spring terminal structures 2, it is able to compress each of the elastic arms, allowing the leaf spring structures 2 to adjust the gap between the movable bracket 21 and the inner wall 12 via the compressed elastic arm 23. Please refer to FIG. 7 to FIG. 8, illustrating the state of use of the female end module 10 of the present disclosure having a male end terminal 200 of a relatively large thickness inserted therein. Since the thickness of the male end terminal is relatively large, when the male end terminal 200 is inserted between the two leaf spring terminal structures 2, each of the elastic arms 23 are further compressed, allowing the movable bracket 21 to move towards the inner wall 12.

Accordingly, the leaf spring terminal structure 2 is able to adjust the gap between the movable bracket 21 and the inner wall 12 via the compression of the elastic arms 23 to allow the elastic arm 23 and the movable bracket 21 to share the pressure exerted on the terminal 22. As a result, when the female end module 10 of the present disclosure is used in conjunction with a male end terminal of different thicknesses 200, the situation of deformation of the terminal 22 due to excessive compression or excessive clamping of the male end terminal 200 may be prevented, thereby achieving the advantage of broad applicability of the female end module 10 and the leaf spring terminal structure 2 thereof of the present disclosure to various male end terminals 200 of different brands and models.

In view of the above, the female end module and leaf spring terminal structure thereof of the present disclosure is able to achieve the expected purpose of use and to overcome known drawbacks

What is claimed is:

1. A female end module, comprising:

a conductive sheet (1), comprising two arms (11), the two arms (11) comprising two inner walls (12) arranged opposite from each other; and two leaf spring terminal structures (2), installed on each of the arms (11) respectively, each of the leaf spring terminal structures (2) comprising:

a movable bracket (21), movably connected to one of the arms (11) to move close to or away from one of the inner wall (12);

a plurality of terminals (22), disposed on the movable bracket (21) and extended in a direction away from the inner wall (12); and at least one elastic arm (23), disposed on the movable bracket (21) and extended in a direction towards the inner wall (12), and abutting against the inner wall (12).

2. The female end module according to claim 1, wherein one of each of the arms (11) and each of the movable brackets (21) comprises at least one slot (3), another one of each of the arms (11) and each of the movable brackets (21) comprises at least one slider (4) slidably engaged with the at least one slot (3), and each of the movable brackets (21) is movably close to or away from each of the inner walls (12).

3. The female end module according to claim 2, wherein a quantity of the slots (3) and a quantity of the sliders (4) are eight respectively, each of the four sliders (4) protrudes outward from a top and a bottom of each of the arms (11) respectively, and each of the movable brackets (21) comprises two U-shaped racks (211) arranged corresponding to each of the inner walls (12), and each of the two slots (3) are defined on two ends of each of the U-shaped racks (211) respectively.

4. The female end module according to claim 3, wherein each of the terminals (22) is an arched rib (221) with two ends integrally connected between each of the two U-shaped racks (211).

5. The female end module according to claim 4, wherein a quantity of the elastic arms (23) is multiple, each of the elastic arms (23) is a V-shaped rib (231) with one end extended from one of the U-shaped racks (211) and another end forming a gap(S) with respect to another one of the U-shaped racks (211).

6. The female end module according to claim 5, wherein the plurality of arched ribs (221) and the plurality of V-shaped ribs (231) of each of the leaf spring terminal structures (2) are arranged alternatively to each other.

7. A leaf spring terminal structure, installed on a conductive sheet (1), the conductive sheet (1) comprising an inner wall (12), the leaf spring terminal structure (2) comprising:

a movable bracket (21), movably connected to the conductive sheet (1) to move close to or away from the inner wall (12);

a plurality of terminals (22), disposed on the movable bracket (21) and extended in a direction away from the inner wall (12); and at least one elastic arm (23), disposed on the movable bracket (21) and extended in a direction towards the inner wall (12) and abutting against the inner wall (12).

8. The leaf spring terminal structure according to claim 7, wherein one of the conductive sheet (1) and the movable bracket (21) comprises at least one slot (3), another one of the conductive sheet (1) and the movable bracket (21) comprises at least one slider (4) slidably engaged with the at least one slot (3), and the movable bracket (21) is movably close to or away from the inner wall (12).

9. The leaf spring terminal structure according to claim 8, wherein a quantity of the slots (3) and a quantity of the sliders (4) are four respectively, the four sliders (4) protrude outward from a top and a bottom of the conductive sheet (1) respectively, and the movable bracket (21) comprises two U-shaped racks (211) arranged corresponding to the inner wall (12), and each of the two slots (3) are defined on two ends of each of the U-shaped racks (211) respectively.

10. The leaf spring terminal structure according to claim 9, wherein each of the terminals (22) is an arched rib (221) with two ends integrally connected between the two U-shaped racks (211).

11. The leaf spring terminal structure according to claim 10, wherein a quantity of the elastic arms (23) is multiple, each of the elastic arms (23) is a V-shaped rib (231) with one end extended from one of the U-shaped racks (211) and another end forming a gap(S) with respect to another one of the U-shaped racks (211).

12. The leaf spring terminal structure according to claim 11, wherein the plurality of arched ribs (221) and the plurality of V-shaped ribs (231) are arranged alternatively to each other.

* * * * *